(12) United States Patent
Titschert et al.

(10) Patent No.: US 8,450,004 B2
(45) Date of Patent: May 28, 2013

(54) INTRINSICALLY-SAFE BATTERY POWER SUPPLY FOR UNDERGROUND MINING

(75) Inventors: Jens Titschert, Lünen (DE); Norbert Schwarz, Recklinghausen (DE); Jörg Wagener, Lünen (DE)

(73) Assignee: Caterpillar Global Mining Europe GmbH, Lunen (DE)

( * ) Notice: Subject to any disclaimer, the term of this patent is extended or adjusted under 35 U.S.C. 154(b) by 866 days.

(21) Appl. No.: 12/341,745

(22) Filed: Dec. 22, 2008

(65) Prior Publication Data
US 2009/0142629 A1 Jun. 4, 2009

Related U.S. Application Data

(63) Continuation-in-part of application No. 11/042,371, filed on Jan. 25, 2005, now abandoned.

(30) Foreign Application Priority Data

Feb. 19, 2004 (DE) .......................... 10 2004 008 569

(51) Int. Cl.
*H01M 2/10* (2006.01)
(52) U.S. Cl.
USPC ................. 429/100; 429/96; 429/98; 429/99; 429/153; 206/703
(58) Field of Classification Search
USPC ................. 429/96, 98, 99, 100, 153; 206/703
See application file for complete search history.

(56) References Cited

U.S. PATENT DOCUMENTS

| 5,149,190 A * | 9/1992 | MacKenzie ................... 362/234 |
| 5,376,475 A | 12/1994 | Ovshinsky et al. |
| 5,476,731 A | 12/1995 | Karsten et al. |
| 6,340,538 B1 * | 1/2002 | King .............................. 429/96 |
| 6,475,680 B1 | 11/2002 | Arai et al. |
| 2001/0033481 A1 | 10/2001 | Chien |
| 2003/0180582 A1 * | 9/2003 | Masumoto et al. ............... 429/7 |
| 2004/0126657 A1 | 7/2004 | Chung |
| 2006/0068281 A1 | 3/2006 | Hiratsuka et al. |

FOREIGN PATENT DOCUMENTS

| DE | 3015751 A * | 10/1981 |
| DE | 30 15 751 C2 | 3/1982 |
| DE | 3834554 | 4/1990 |
| GB | 2005037 | 4/1979 |
| GB | 2077027 | 12/1981 |
| GB | 2094055 | 9/1982 |

* cited by examiner

*Primary Examiner* — Zachary Best
(74) *Attorney, Agent, or Firm* — Foley & Lardner LLP

(57) ABSTRACT

An intrinsically-safe battery power supply for electrical equipment in underground mining and in other areas exposed to the danger of explosion is disclosed. The power supply includes at least one chargeable storage battery cell disposed in a battery housing. At least one storage battery cell comprises a chargeable lithium storage battery cell and the battery housing is configured to be pressure-resistant and to receive all lithium storage battery cells in a manner so as to be protected from explosion. The pressure-resistant configuration of the battery housing enables the use of lithium storage battery cells in underground mining. Once the battery power supply fulfills all requirements of ignition protection certification, even modern types of lithium storage battery cell can be disposed in the battery housing.

24 Claims, 2 Drawing Sheets

INTRINSICALLY-SAFE BATTERY POWER SUPPLY FOR UNDERGROUND MINING

CROSS REFERENCE TO RELATED APPLICATIONS

This application is a continuation-in-part of U.S. patent application Ser. No. 11/042,371 filed Jan. 25, 2005 now abandoned, which claims priority from German Patent Application No. 10 2004 008 569.2 filed Feb. 19, 2004, both expressly incorporated in their entireties herein by reference.

FIELD OF THE INVENTION

The present invention relates to an intrinsically-safe battery power supply for electrical equipment in underground mining or in other areas exposed to the danger of explosion or firedamp ignition, with at least one chargeable storage battery cell disposed in a battery housing.

BACKGROUND OF THE INVENTION

In underground mining and in other areas exposed to the danger of explosion or firedamp ignition, there is a need for the supply, independently of a power supply network, of sufficient intrinsically-safe voltage to electrical equipment. In underground mining, for example, a chargeable battery power supply that uses Nickel Cadmium storage battery cells (NiCad accumulators) is utilized for support shield controllers, remote controllers, measuring equipment in poorly-accessible areas and other electrical equipment. The NiCad storage batteries have a low charge capacity and poor recharging characteristics since, due to the so-called "memory effect", reduced charging capacity results if the NiCad storage battery was not completely discharged before being recharged. Due to the low charging capacity of NiCad accumulators, a great number of spare storage batteries is required in underground mining that have to be taken underground and temporarily stored there. Recharging of the NiCad storage batteries takes place exclusively on the surface, wherein the transportation of charged and discharged storage batteries (accumulators) also represents a logistical problem.

In underground mining, power supply sources may only be used if they are certified for use in areas that are exposed to the danger of explosion and correspond with the ignition protection legislation (e.g. ATEX, IEC, Eex etc.) that is applicable in the place of utilization. Here, each approval examination is associated with substantial cost. Hence for reasons of cost, it is hardly possible to have repeatedly modified storage battery cells re-certified for use in areas that are exposed to the danger of explosion.

For this reason, intrinsically-safe battery power supplies are often used in underground mining that do not technologically correspond to the latest state of the art and whose basic structure is disclosed in DE 30 15 751 C2 from 1980. The battery power supplies comprise NiCad storage battery cells that are disposed in a battery housing and electronics, that are not intrinsically-safe, cast in silicon rubber and embedded in an electronics housing, wherein the two housings are inserted together in a master housing. Alternatively, the storage battery cells can be cast together with a necessary protection circuit to comply with the ignition protection class that is applicable to gain certification. Repair of such battery power supplies, especially the replacement of storage batteries within such battery power supplies, is not possible without unacceptable cost.

Outside the field of underground mining, especially in the field of the communications and entertainment industries, lithium storage battery cells (lithium accumulators) are increasingly replacing the lead-containing batteries and NiCad storage battery cells that have previously been used. Fundamental efforts are therefore being made to be able to use lithium storage battery cells in other areas of technology, as can be seen, for example, in U.S. Pat. No. 5,376,475 that relates to chargeable, aqueous lithium hydrogen ion batteries. There are, however, substantial safety problems associated with the use of lithium storage battery cells regarding possible explosion of the storage battery cells, as can be seen in U.S. Pat. No. 5,376,475. Up to now, lithium storage battery cells have therefore not been used in underground mining and other areas that are exposed to the danger of explosion.

BRIEF DESCRIPTION

According to one aspect, an intrinsically-safe battery power supply is provided for electrical equipment that can be used in underground mining and other areas that are exposed to the danger of explosion. The battery power supply can comprise storage battery cells that correspond with the latest technical state of development and for which a certification examination for the respective ignition protection class can be provided at minimum or no additional cost.

In one embodiment, at least one storage battery cell comprises a chargeable lithium storage battery cell (lithium accumulator) and a battery housing is configured to receive all lithium storage battery cells and to be explosion-proof and pressure resistant. According to the same or other aspect, an intrinsically-safe battery power supply comprises a battery housing that is configured to be pressure-resistant in such a way that all lithium storage battery cells disposed therein do not present a danger of explosion to their environment. Advantageously, only the pressure-resistant battery housing will be subjected to certification for the respective ignition protection class and the specified internal resistance against pressure need only be equivalent to an internal pressure that could possible be generated by an explosion of a lithium storage battery cell. Therefore, exchanging the actual lithium storage battery cells that are disposed in the certified, pressure-resistant battery housing does not cause the certification of the battery power supply to be invalidated. Due to the pressure-resistant configuration of the battery housing, it will now be possible to use lithium storage battery cells in underground mining. These are not susceptible to a noticeable "memory effect", they have a substantially longer service life and with a substantially higher charging capacity, they also allow a significantly longer operating phase underground.

DETAILED DESCRIPTION

Figure 1:
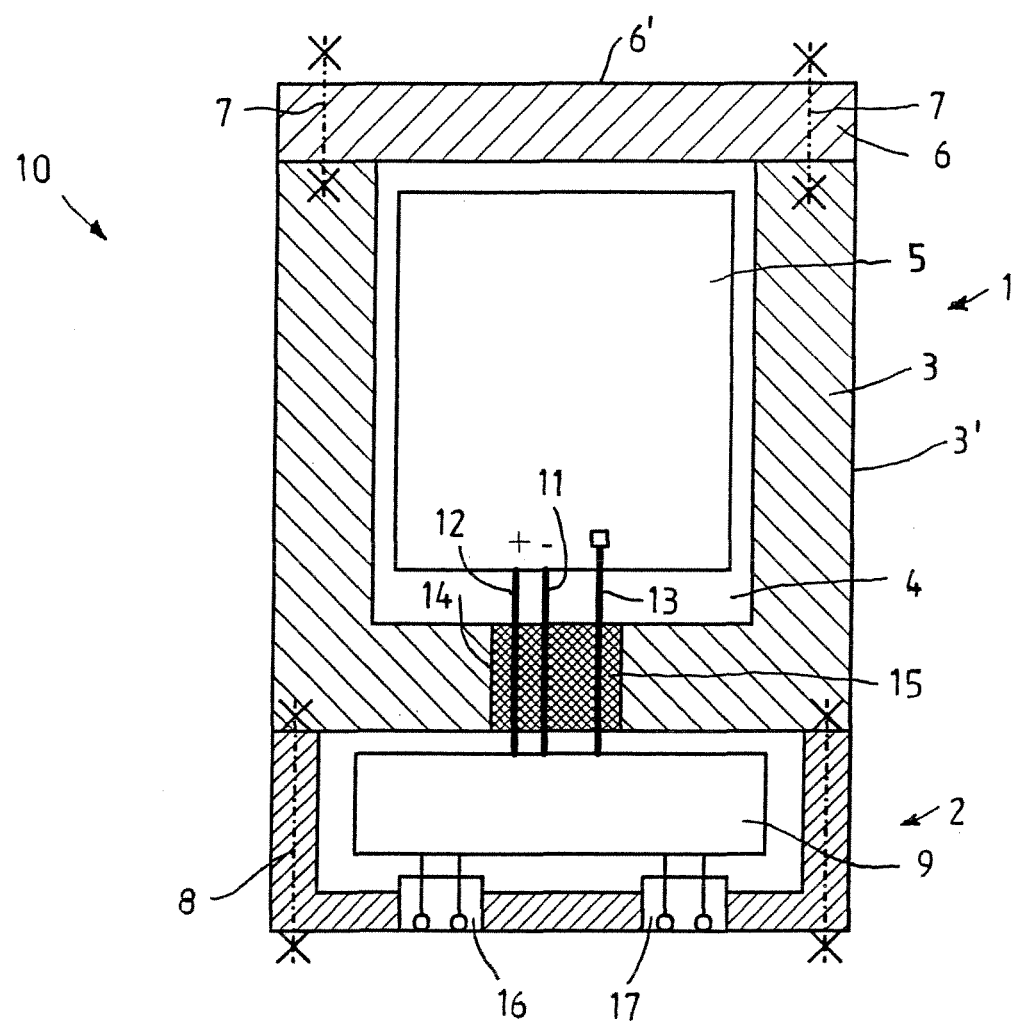
FIG. 1 is a schematic illustration of a battery power supply for underground mining.

In one embodiment, the battery housing is pressure-resistant and gas-tight. The battery housing can be configured to be resistant to electrolyte. The aforementioned measures ensure that different storage battery technologies can be used for the lithium storage batteries without requiring renewed certification for the ignition protection class. This is especially advantageous in that smaller alterations to the cell structure, to the actual composition of the lithium storage battery cell and to the housing of the lithium storage battery cell do not require renewed ignition protection certification. New storage battery technology can therefore be integrated immediately into the intrinsically-safe battery power supply described herein.

The lithium storage battery cells can basically function in accordance with any possible storage battery or accumulator technology. In one embodiment, these can be lithium ion storage battery cells, lithium polymer storage battery cells or lithium storage battery cells with a fluid electrolyte. By way of example, reference is made to U.S. Pat. No. 5,376,475, herein incorporated by reference.

In order to guarantee electrically faultless functioning of lithium storage battery cells that are installed in pressure-resistant battery housings, independent of the technological structure of the lithium storage battery cells, an intrinsically-safe circuit can be disposed together with the lithium storage battery cells in the battery housing to limit overcurrent and/or overvoltage. By use of this circuit, the current and the voltage that is present at the contact terminals or contacts of the pressure-resistant battery housing can always be limited at the storage battery side to specified maximum electrical parameters, independent of the type of storage battery used.

In another embodiment, a charging circuit is also disposed in the battery housing in addition to the storage batteries. This allows the lithium storage battery cells to be charged via a charging plug that is connected to the underground, intrinsically-safe power supply network. In one embodiment, however, the battery housing is housed in a master housing or is provided with an enveloping or additional housing so that the intrinsically-safe battery power supply can be substantially constructed in accordance with a modular principle in that lithium storage battery cells, encapsulated so as to be explosion-proof, are disposed in the pressure-resistant battery housing and can be combined with all necessary or desired circuits in enveloping or master housings. In addition, with this embodiment the battery housing can comprise a lightweight, pressure-resistant material such as a light metal, in particular an aluminum sheet, while the master housing is formed from a suitable plastic.

The battery power supply can include a charging circuit, in particular an intrinsically-safe charging circuit being disposed within the master housing and outside of the battery housing. Here, it is advantageous if the charging circuit comprises control electronics to control the charging current and charging voltage for the lithium storage battery cells. With regard to the embodiment with the master housing, it is especially advantageous if a charging socket is attached to the master housing in which a charging plug that can be supplied with current from the underground power supply network can be inserted. The charging and current consumption sockets and/or operating switch and/or on/off switch can be attached to the master housing. With this embodiment, an external protection circuit can be disposed within the master housing and outside of the battery housing. The charging circuit and the protection circuit can then expediently be electrically incorporated between electrical contact points or connection lines on the pressure-resistant battery housing for the lithium storage battery cells and the charging and current consumption sockets.

In one embodiment, the lithium storage battery cells in the pressure-resistant battery housing together supply an internal operating voltage that is greater than the external, intrinsically safe operating voltage that can be applied to the electrical equipment. In order to obtain a sufficiently high voltage potential, several lithium storage battery cells can be disposed in series. In order to carry out charging with the intrinsically-safe underground power supply network in spite of the higher internal voltage potential without causing an excess voltage at the end consumer, the charging circuit and/or the current limiting circuit can be provided with direct current transformers to transform the voltage potentials to the corresponding higher internal operating voltage or lower external operating voltage. DC/DC transformers can be used for this transformation.

By way of example, FIG. 1 shows a battery power supply for underground mining, indicated by reference number 10. In the illustrated exemplary embodiment, the battery power supply comprises a pressure resistant battery housing 1 and an enveloping or additional housing 2. The battery housing 1 comprises a battery box 3, in the receiving space 4 of which is disposed a lithium ion storage battery cell 5, which can comprise several lithium ion storage battery cells connected in series. The battery box 3 is closed, for example by use of several bolted connections 7 indicated in the drawing, in a pressure resistant manner by a battery box lid 6, through which the lithium ion storage battery cells can be installed in the receiving space 4. The strengths of the surrounding walls of the battery box 3 and the lid 6 and the bolted connections 7 are configured in such a way that the battery housing 1 remains closed in a pressure proof and gas-tight manner even if an explosion with a specified maximum explosion pressure occurs in the interior space 4. Here, the resistance to pressure of the battery housing 1 is adapted to the maximum burst pressure that is to be expected in the case of lithium storage battery cells 5. The material of the battery housing 3 and the lid 6, and the seals disposed between the two, is selected so that the battery housing 1 is gas-tight and resistant to those electrolytes that are used by chargeable lithium storage battery cells 5 for the movement and conduction of ions in order to provide an energy supply with the lithium storage battery cell or cells 5 for intrinsically safe equipment in underground mining.

In the illustrated exemplary embodiment, the enveloping housing 2 is bolted on a front side of the battery box 3, opposite the lid 6, by means of a bolted connection 8. The battery box 3 and the lid 6 can be formed of a light metal, such as aluminum and the additional housing 2 can be formed of a suitable plastic. The embodiment example only serves to schematically explain the structure of the battery power supply, since in one embodiment (not shown) the battery box 3 and its lid 6 comprise a light metal such as aluminum, while the enveloping housing 2 comprises a suitable plastic and completely encloses the battery box and the lid 6, so that the battery power supply 10 does not have any metallic surfaces. In the illustrated embodiment, on the other hand, if comprising an aluminum plate, the surface 3' of the battery box 3 and the surface 6' of the lid 6 could be provided with a plastic coating to achieve the same effect, though this is not required.

A multi-function circuit is shown schematically with a circuit board 9 in the enveloping housing 2. All circuits on the circuit board 9 are preferably intrinsically safe. The circuit 9 is connected with the corresponding contact points on the lithium storage battery cell 5 via electrical connections 11, 12 or connection lines and at least one sensor line 13 for a temperature sensor. The lines 11, 12, 13 penetrate an opening 14 in the base of the battery box 3, wherein the opening 14 is configured as a pressure-resistant opening 15 and is closed in a suitable manner by means of installed parts adhesives and or stability supports. On the circuit board 9 there is both an intrinsically-safe charging circuit and an intrinsically-safe protection circuit disposed. The protection circuit is switched electrically between the lines 11, 12, 13 and a schematically-illustrated current consumption socket 16 that is certified for use in underground mining, to which a consumer can be connected. A charging socket 17 is also disposed in the enveloping housing 2 in addition to the current consumption socket 16. The circuit board 9 contains a charging circuit that is integrated between the charging socket 17 and the connection lines 11, 12 for the lithium storage battery cell 5, so that the lithium storage battery cell of the intrinsically-safe battery power supply 10 can be recharged underground via a charging plug, not illustrated, that is connected to the underground power supply network. In particular, in FIG. 1, charging circuit and overcurrent circuit, integrated in circuit 9, are both electrically incorporated between electrical contact points 11, 12 on the battery housing 3 for the lithium storage battery cells 5 and the charging and current consumption sockets 16, 17.

In one embodiment, the lithium storage battery cells 5 have a voltage potential at both connection terminals 11, 12 that is greater than the voltage potential required for operation of controllers, extraction controllers, measuring equipment and other, portable, electrical equipment without the possibility of connection to the underground energy supply network. Both the charging and the protection circuit on the circuit board 9 then have direct current transformers (DC/DC transformers) to transform the internal operating voltage of the storage battery cells 5 to the external operating voltage required at the current consumption socket 16 or to transform the operating voltage at the charging socket 17 to the required higher operating voltage.

While not shown in FIG. 1, an additional circuit to limit overcurrent and/or overvoltage can be disposed in the interior space 4 of the battery housing 1 in an alternate embodiment, via which the maximum value of the voltage supplied by the lithium storage battery cells 5 can be limited. In addition, the charging circuit can comprise control electronics to control the charging current and voltage for the lithium storage battery cells.

Figure 2:
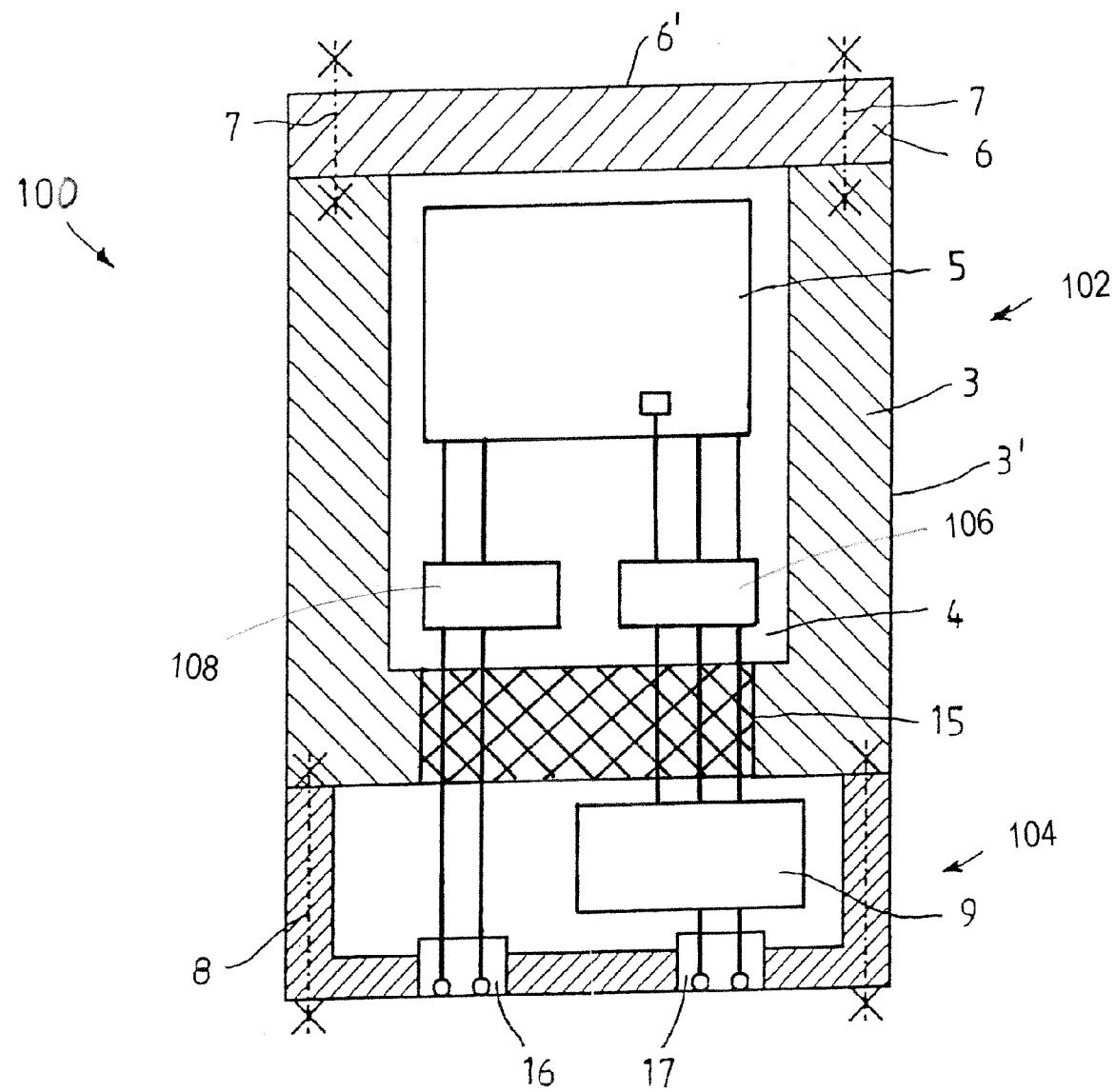
FIG. 2 is a schematic illustration of another battery power supply for underground mining.

FIG. 2 shows an alternate battery power supply for underground mining indicated by reference number 100. Except as indicated below, the battery power supply illustrated in FIG. 2 is generally similar to that illustrated in FIG. 1 and thus like reference numerals are used to identify like components. The battery supply of FIG. 2 comprises a pressure resistant battery housing 102 and an enveloping or additional housing 104 which can be formed the same or similar to battery housing 1 and additional housing 2, respectively. The battery housing 102 comprises a battery box 3, in the receiving space 4 of which is disposed a lithium ion storage battery cell 5, which can comprise several lithium ion storage battery cells connected in series.

The battery box 3, which can be formed from a material that is suitably resistant to electrolyte, is closed, for example by use of several bolted connections 7, in a pressure resistant manner by a battery box lid 6', through which the lithium ion storage battery cells can be installed in a receiving space 4. The strength of the surrounding walls of the battery box 3 and the lid 6 and the bolted connection 7 are configured in such a way that the battery housing 102 remains closed in a pressure proof and gas-tight manner even if an explosion with a specified maximum explosion pressure occurs in the interior space 4. Here, the resistance to pressure of the battery housing 102 is adapted to the maximum first pressure that is expected in the case of lithium storage battery cells 5. The material of the battery housing and the lid 6, and the seals disposed between the two, is selected so that the battery housing 102 is gas-tight and resistant to those electrolytes that are used by chargeable lithium storage battery cells 5 for the movement and conduction of ions in order to provide an energy supply with the lithium storage battery cell or cells 5 for intrinsically safe equipment in underground mining.

In the illustrated exemplary embodiment of FIG. 2, the enveloping housing 104 is bolted on a front side of the battery box 3, opposite the lid 6, by means of a bolted connection 8. Like the embodiment of FIG. 1, the embodiment of FIG. 2 only serves to schematically explain the structure of the battery supply. If desired, surface 3' of the battery box 3 and surface 6' of the lid 6 could be provided with a plastic coating. The enveloping housing 102 can be formed from a suitable plastic. Also if desired, the battery box 3 and its lid 6 can comprise a light metal such as aluminum. Alternatively, though not shown, the enveloping housing 2 can completely enclose the battery box 3 and the lid 6.

One or more circuits can be provided in the illustrated battery power supply 100, and all such circuits can be intrinsically safe. In FIG. 2, circuit board 9 is a protection circuit disposed within the additional housing 104. In addition to the circuit board 9, circuit or circuit board 106 can be a charging circuit and circuit or circuit board 108 can be an overcurrent circuit. In this arrangement, the intrinsically-safe circuits 106, 108 are each disposed in the battery housing 3 together with the storage battery cells 5. The overcurrent circuit 108 is particularly disposed in the battery housing 3, specifically in the receiving space 4, together with the storage battery cells 5 between the storage battery cells 5 and a consumption socket 16. The charging circuit 106 is particularly disposed in the battery housing 3, specifically in the receiving space 4, together with the storage battery cells 5 between the storage battery cells 5 and a charging socket 17, and more specifically between the storage battery cells 5 and the protection circuit 9. The circuit 108 can limit overcurrent and/or overvoltage on the consumption socket 16, whereas the charging circuit 106 can comprise control electronics to control the charging current and voltage for the storage battery cells 5 disposed in the battery housing 3.

Accordingly, the charging circuit 106 of FIG. 2 differs from the circuit 9 of FIG. 1, which can include a charging circuit, in that the charging circuit 106 is disposed within the battery housing 3 in the receiving space 4, whereas the circuit 9 of FIG. 1 is disposed within the additional housing 2 and outside the battery housing 3.

Numerous modifications will be apparent to the person skilled in the art which modifications should fall within the scope of protection of the appended claims. The illustrated embodiments are purely schematic and should not limit the scope of protection of the appended claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A battery power supply adapted for underground mining, the battery power supply comprising:
 a battery housing having a surrounding wall defining an interior space accessible through first open end, the housing including a battery housing lid releasably affixed to the battery housing for sealing only the first opening in the battery housing;
 a battery disposed in the interior space;
 an additional housing secured to the battery housing, the additional housing defining a hollow region separate from the interior space; and a circuit board disposed in the additional housing, the circuit board being in electrical communication with the battery by use of electrical connections extending through a second opening defined in the battery housing, the second opening being a pressure-resistant opening for the separation between interior space and the hollow region;

wherein the surrounding wall, the battery housing lid, and affixment therebetween are such that the battery housing remains closed in an isolated pressure proof and gas-tight manner in the event that the battery explodes.

2. The battery power supply of claim 1 wherein the battery housing and the lid are formed from aluminum and the additional housing is formed from plastic.

3. The battery power supply of claim 1 wherein the battery is a lithium battery.

4. A battery power supply adapted for use in underground mining and other areas exposed to danger of explosion or firedamp ignition, the battery power supply comprising:
   a battery housing defining first interior region accessible through a first opening in the housing;
   a battery housing lid sealingly configured to seal the first opening defined in the battery housing;
   at least one lithium battery disposed in the interior region of the battery housing, the at least one lithium battery having a specified maximum explosion pressure;
   a secondary housing having a second interior region accessible through a second opening, the secondary housing being secured to the battery housing and the second opening being sealed by the engagement of the secondary housing with the battery housing;
   a circuit board and circuitry disposed in the interior region of the secondary housing and in electrical communication with the at least one lithium battery;
   wherein the battery housing and the battery housing lid remain closed in an isolated pressure-proof and gas-tight manner even if an explosion with the specified maximum explosion pressure occurs in the interior region of the battery housing.

5. The battery power supply of claim 1 further including at least one intrinsically-safe circuit disposed in the battery housing together with the battery, the at least one intrinsically-safe circuit including at least one of an overcurrent circuit and an overvoltage circuit.

6. The battery power supply of claim 5, wherein the at least one intrinsically-safe circuit further includes a charging circuit comprising control electronics to control the charging current and voltage for the battery.

7. The battery power supply of claim 5, further including a second circuit with the battery housing which includes a charging circuit comprising control electronics to control the charging current and voltage for the battery.

8. The battery power supply of claim 1, wherein the circuit within the additional housing is a protection circuit.

9. The battery power supply of claim 7, wherein the circuit within the additional housing is a protection circuit.

10. The battery power supply of claim 1, wherein the battery is composed of battery cells.

11. The battery power supply of claim 4 wherein at least one intrinsically-safe circuit is disposed in the battery housing together with the battery, the at least one intrinsically-safe circuit including at least one of an overcurrent circuit and an overvoltage circuit.

12. The battery power supply of claim 4 wherein the circuit is an overcurrent circuit to limit overcurrent and/or overvoltage on a consumption socket.

13. The battery power supply of claim 4, wherein the circuit is a charging circuit comprising control electronics to control the charging current and voltage for the battery.

14. The battery power supply of claim 11, wherein a second circuit with the housing is a charging circuit comprising control electronics to control the charging current and voltage for the battery.

15. The battery power supply of claim 4, wherein the circuit within the additional housing is a protection circuit.

16. The battery power supply of claim 14, wherein the circuit within the additional housing is a protection circuit.

17. The battery power supply of claim 4, wherein the battery is composed of battery cells.

18. The battery power supply of claim 4, wherein the battery housing further includes a second battery housing opening and the second battery housing opening being a pressure-resistant opening for the separation between first and second interior spaces, the secondary housing fully encapsulating the second battery housing opening.

19. The battery power supply of claim 18, wherein the battery housing has a first side and a second side, the first opening being disposed on the first side and the second battery housing opening being dispose and the second side.

20. The battery power supply of claim 19, wherein the first and second sides of the battery housing are opposite of one another.

21. A battery power supply adapted for underground mining, the battery power supply comprising:
   a battery housing having a surrounding wall defining an interior space accessible through an open end, the housing including a lid releasably affixed to the battery housing;
   a battery disposed in the interior space;
   an additional housing secured to the battery housing, the additional housing defining a hollow region;
   a circuit board disposed in the additional housing, the circuit board being in electrical communication with the battery by use of electrical connections extending through an opening defined in the battery housing;
   the surrounding wall, the lid, and affixment therebetween are such that the battery housing remains closed in a pressure proof and gas-tight manner in the event that the battery explodes;
   at least one intrinsically-safe circuit is disposed in the battery housing together with the battery, the at least one intrinsically-safe circuit including an overcurrent circuit to limit overcurrent and/or overvoltage on a consumption socket, the power supply further including a charging circuit comprising control electronics to control the charging current and voltage for the battery.

22. The battery power supply of claim 21 wherein the at least one intrinsically-safe circuit further includes at least one of a DC/DC transformer to transform an internal operating voltage of the storage battery cells to an external operating voltage.

23. A battery power supply adapted for underground mining, the battery power supply comprising:
   a battery housing having a surrounding wall defining an interior space and having a first and a second opening, the first opening being configured to allow access into the interior space, the second opening being a pressure-resistant opening;
   a battery disposed in the interior space wherein the first opening allows for access and/or replacement of the battery;

a battery housing lid configured to be releasably affixed to the battery housing for sealing the first opening in the battery;

an additional housing having an outer housing wall defining an additional housing opening, the additional housing being secured to the battery housing such that the additional housing opening is in alignment with the second opening and the additional housing completely covering the second opening and the additional housing opening being closed by the battery housing, the additional housing defining a hollow region; and, a circuit board disposed in the additional housing, the circuit board being in electrical communication with the battery by use of electrical connections extending through the pressure-resistant opening and the additional housing opening;

the surrounding wall, the battery housing lid, and affixment therebetween are such that the battery housing remains closed in a pressure proof and gas-tight manner in the event that the battery explodes.

24. The battery power supply of claim 21 further including a current consumption socket and a charging socket, the current consumption socket and the charging socket being positioned on the additional housing.

* * * * *